United States Patent
Casamona et al.

(10) Patent No.: US 10,885,637 B2
(45) Date of Patent: *Jan. 5, 2021

(54) SYSTEM AND METHOD FOR DYNAMICALLY TRACKING AND INDICATING A PATH OF AN OBJECT

(71) Applicant: Disney Enterprises, Inc., Burbank, CA (US)

(72) Inventors: David L. Casamona, Orlando, FL (US); Frank C. Guida, Jr., Brewster, NY (US); Michael F. Gay, Collinsville, CT (US); Anthony J. Bailey, Wallingford, CT (US)

(73) Assignee: Disney Enterprises, Inc., Burbank, CA (US)

(*) Notice: Subject to any disclaimer, the term of this patent is extended or adjusted under 35 U.S.C. 154(b) by 144 days.

This patent is subject to a terminal disclaimer.

(21) Appl. No.: 15/905,335

(22) Filed: Feb. 26, 2018

(65) Prior Publication Data

US 2018/0182108 A1   Jun. 28, 2018

Related U.S. Application Data

(63) Continuation of application No. 12/834,344, filed on Jul. 12, 2010, now Pat. No. 9,934,581.

(51) Int. Cl.
| | | |
|---|---|---|
| *G06T 7/20* | (2017.01) | |
| *G06T 17/00* | (2006.01) | |
| *G06T 19/00* | (2011.01) | |
| *H04N 5/262* | (2006.01) | |
| *H04N 5/272* | (2006.01) | |

(52) U.S. Cl.
CPC ............... *G06T 7/20* (2013.01); *G06T 17/00* (2013.01); *G06T 19/006* (2013.01); *H04N 5/262* (2013.01); *H04N 5/272* (2013.01); *G06T 2207/10016* (2013.01); *G06T 2207/30224* (2013.01); *G06T 2207/30241* (2013.01)

(58) Field of Classification Search
CPC ......... G06T 7/20; G06T 17/00; G06T 19/006; G06T 2207/10016; G06T 2207/30224; G06T 2207/30241; H04N 5/262; H04N 5/272

See application file for complete search history.

(56) References Cited

U.S. PATENT DOCUMENTS

2009/0262137 A1* 10/2009 Walker ................... H04H 60/04
                                                                345/629

* cited by examiner

*Primary Examiner* — Katrina R Fujita (74) *Attorney, Agent, or Firm* — Fay Kaplun & Marcin, LLP (57) ABSTRACT

A system for dynamically tracking and indicating a path of an object comprises an object position system for generating three-dimensional object position data comprising an object trajectory, a software element for receiving the three-dimensional object position data, the software element also for determining whether the three-dimensional object position data indicates that an object has exceeded a boundary, and a graphics system for displaying the object trajectory.

20 Claims, 6 Drawing Sheets

SYSTEM AND METHOD FOR DYNAMICALLY TRACKING AND INDICATING A PATH OF AN OBJECT

BACKGROUND

In many televised sporting events, it is desirable to track and display the movement of an object. For example, in baseball, it is desirable to track and display the movement of the baseball so that television viewers may observe the flight path of the baseball. Similar applications exist for other sporting events, such as basketball, hockey, tennis, etc.

Previous solutions to display an object have utilized image processing techniques to determine the location of the object, but these systems have a very limited range and limited accuracy in a targeted area. Typically used for pitch tracking in a baseball application, wide coverage of an entire stadium for real-time hit detection and baseball tracking is not currently possible using such image processing techniques.

Therefore, there is a need to be able to track, and display in real time the flight path of a baseball during a live television broadcast. Further, it would be desirable to be able to show other aspects of the object, such as trajectory, spin, velocity, etc. Finally, it would be desirable to be able to show estimated object impact points with a virtual home run wall, stadium/stands, and also display the ground while the object is still in flight.

SUMMARY

Embodiments of the invention include a system for dynamically tracking and indicating a path of an object. The system comprises an object position system for generating three-dimensional object position data comprising an object trajectory, a software element for receiving the three-dimensional object position data, the software element also for determining whether the three-dimensional object position data indicates that an object has exceeded a boundary, and a graphics system for displaying the object trajectory.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method for dynamically tracking and indicating a path of an object can be implemented in any video broadcast system. The system and method for dynamically tracking and indicating a path of an object can be implemented in hardware, software, or a combination of hardware and software. When implemented in hardware, the system and method for dynamically tracking and indicating a path of an object can be implemented using specialized hardware elements and logic. When the system and method for dynamically tracking and indicating a path of an object is implemented in software, the software can be used to process various system inputs to generate object tracking information. The software can be stored in a memory and executed by a suitable instruction execution system (microprocessor). The hardware implementation of the system and method for dynamically tracking and indicating a path of an object can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for dynamically tracking and indicating a path of an object comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While the system and method for dynamically tracking and indicating a path of an object is described herein in the context of tracking and indicating a path of a baseball, the system and method for dynamically tracking and indicating a path of an object can be used to track and indicate the path of any object.

Figure 1:
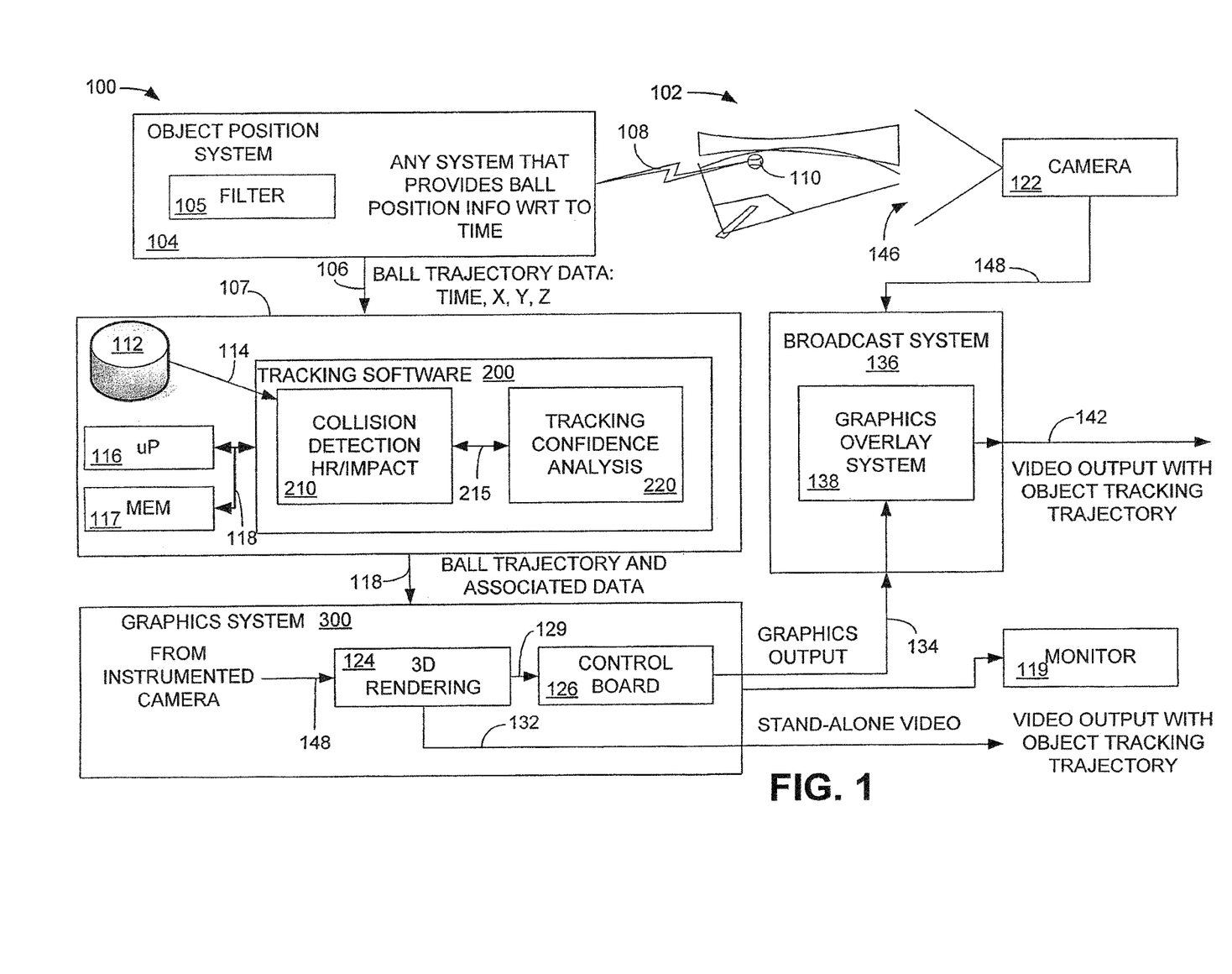
FIG. 1 is a block diagram illustrating an example of a system for dynamically tracking and indicating a path of an object.

FIG. 1 is a block diagram illustrating an example of a system for dynamically tracking and indicating a path of an object. The system 100 for dynamically tracking and indicating a path of an object generally includes an object position and tracking system 104, processing system 107, and a graphics system 300. The processing system 107 can be any general purpose or special purpose computer system, and in an embodiment, can be implemented using a personal computer (PC), laptop computer, or other computing device. Generally, the processing system 107 comprises a processor 116, a memory 117 and tracking software 200, in omni-directional communication over a bus 118. The processing system also includes a database 112 containing three-dimensional data.

The object position and tracking system 104 can be implemented using a number of different systems, and, in an embodiment, can be implemented as a radar-based system that can detect the position of an object 110. For example purposes only, the object 110 can be a baseball, or other moving object in a sports event, that is traveling within a radar-observable area, such as a baseball stadium 102. The reference numeral 108 is intended to refer to either a one-way or a two-way radio frequency (RF) radar signal that allows the object position and tracking system 104 to develop position information relating to the relative position of the object 110 in the stadium 102 and with respect to time.

The object position and tracking system 104 also includes a Kalman filter 105. As known in the art, a Kalman filter produces estimates of the true values of measurements and their associated calculated values by predicting a value, estimating the uncertainty of the predicted value, and computing a weighted average of the predicted value and the measured value. The most weight is given to the value with the least uncertainty. The estimates produced by the method tend to be closer to the true values than the original measurements because the weighted average has a better estimated uncertainty than either of the values that contributed to the weighted average.

The object position and tracking system 104 develops raw trajectory data relating to the three-dimensional (e.g., the X, Y and Z position of an object 110 using a Cartesian coordinate system) position of the object 110 with respect to time. The object position and tracking system 104 provides the raw ball trajectory data to the tracking software 200 over connection 106. The raw trajectory data can include a variety of information. For example, but not limited to, the raw trajectory data can be spatial, temporal, confidence, and may contain other ancillary tracking information that describes the position and status of the object being tracked. The raw trajectory data can be in the form of ascii text, binary data, or any other form of information transfer protocol, or any combination thereof.

In an embodiment, the communication from the object position and tracking system 104 to the tracking software 200 can be done using an available interface, such as, for example, Windows Communication Foundation. In an embodiment, the object position and tracking system 104 notifies the tracking software with events that describe the state of the object 110. For example, the following states may be communicated from the object position system 104 to the tracking software 200: Idle—The system is ready to track; Hit Detected—The impact between the bat and ball has been sensed; Tracking—The object position and tracking system has acquired and locked onto the ball in flight; Track Lost—The object position and tracking system has lost track of the ball due to interference, weak signal, or range; Track Aborted—The user has cancelled tracking of the current hit; Post Processing—Final data smoothing and spin analysis are being carried out; Saving Data—Data is being saved; Track Complete—All tracking processes are finished; Error—A tracking or system error has occurred.

In an embodiment using a baseball as the object 110, the object position and tracking system 104 is armed and awaiting a pitch. After a pitch is sensed, the object position and tracking system 104 checks for a reversal of the ball velocity and other metrics to detect if the ball is hit. If it was, the object position and tracking system 104 confirms the reversal of the ball velocity, and then notifies the tracking software 200 with a communication packet containing all the accumulated position points for the current trajectory and basic launch data (ball velocity, horizontal/vertical launch angles, and spin velocity). Thereafter, the object position and tracking system 104 sends position points to the tracking software 200 in real time while the ball is in flight. The trajectory ends when the ball is caught or impacts the ground or stands. The entire trajectory is then post-processed to analyze the ball spin during flight and provide a best-fit smoothed trajectory, which is available to the tracking software 200 shortly after the ball lands.

If the ball is tracked with sufficient quality and distance before being lost, the object position and tracking system 104 provides a predicted/estimated trajectory to the tracking software that can be processed as if it were actual data.

The tracking software 200 receives the ball trajectory data from the object position and tracking system 104, and also receives three-dimensional data relating to the stadium 102 from the database 112. The "3D Stadium" data can be any collection of three dimensional data that represents, in whole or in part, the venue or environment in which the object 110 is being tracked. Not limited to the actual geometry of the venue, this data can be an interpretation or estimation of the venue or environment. The 3D data can comprise, but is not limited to; point, cloud, vertex, polygonal, voxel, textural data, etc. Two dimensional (2D) data that can be interpreted as 3D data (e.g., and image based displacement, normal, or depth maps) are also valid forms of data that can be used to describe the "3D Stadium"

The tracking software 200 includes a collision detection module 210 and a tracking confidence and analysis module 220, which are in bidirectional communication over connection 215. The 3D stadium model data is provided over connection 114 to the collision detection module 210. The tracking software 200 provides ball trajectory and associated data over connection 118 to a graphics system 300.

The tracking software 200 receives the raw trajectory data from the object position and tracking system 104 and converts the raw trajectory data into a form that the graphics system can use. The raw trajectory data can be converted into any data type that the graphics system 300 can interpret (e.g., ascii text, binary, or other information transfer protocol, or any combination thereof.). The converted data can include, but is not limited to, positional, rotational, temporal, departure angle, maximum height, predicted landing point and like data for the object 110 being tracked. The tracking software 200 also monitors the state of the object position and tracking system 104 and can display the state of the object position and tracking system 104 to an operator over a monitor 119, or over another monitor. If the object position and tracking system 104 loses track of the object a determination is made whether the provided predicted/synthesized path should be used or not. If so, the predicted points are provided to the graphics system 300 as if they were actual measurements.

The collision detection module 210 determines whether the object 110 has been impacted, and also determines whether or not the object will exceed a certain point within the stadium 102. In an embodiment, the collision detection module 210 determines whether the object has passed a particular location in the stadium 102. The 3D stadium model provided by the database 112 allows the tracking software to develop a "virtual curtain" or a "virtual wall" extending upward from a rear wall of the stadium. The collision detection module 210 can determine whether the object has passed the "virtual wall" or has impacted within the stadium 102. The tracking software 200 performs a three dimensional cross check of the actual or projected trajectory relative to the "3D Stadium" data. As part of the cross check, the tracking software 200 detects if the actual, or projected, trajectory is at any point coincident with the data that forms the "3D Stadium". If the collision detection module 210 determines that the actual or projected trajectory is at any point coincident with the data that forms the "3D Stadium," then a collision or impact event is signaled by the tracking software 200.

The memory 117 can be used to store the trajectories for replays, comparisons, and other analysis.

The tracking confidence analysis module 220 can determine the current position of the object in the trajectory provided by the object position tracking system 104 to determine whether the ball will be a home run.

The object trajectory and associated data provided over connection 118 is provided to the graphics system 300. The associated data can be, for example, signals other than the trajectory data, such as, for example, whether the ball is destined to be a home run (GOING), where the ball has officially crossed the home run wall (GONE), if the data is not reliable, remove the on-screen graphics (LOSE IT), and a manual override to end the on-screen graphics for any reason (ABORT).

An aspect of the tracking software 200 is the ability to monitor the signals and quality of the trajectory data from the object position and tracking system 104 so that bad or inaccurate graphics are not put to air. If the object position and tracking system 104 loses the object and does not have sufficient data to construct a predicted path (or if the operator physically aborts the tracking), the tracking software sends an abort signal to the graphics system 300, and the trail on the ball is faded off.

The graphics system 300 includes a three-dimensional (3D) rendering engine 124 and a control board 126. The output of the instrumented camera 122 is provided to the 3D rendering engine 124 and to a broadcast system 136 over connection 148. The instrumented camera 122 captures a field of vision illustrated using reference to a 146. In an embodiment, the field of vision 146 includes the stadium 102 and the object 110. The video provided over connection 148 is a real-time video feed showing the object 110 traveling within the stadium 102. The graphics system 300 receives object position points in real-time and associated data containing status information from the tracking software 200. The status information received form the tracking software 200 indicates whether the projected path of the object will result in the object exiting the stadium as a home run, and also indicates when the object has actually crossed the virtual wall designating it as an official home run.

The 3D rendering engine 124 develops a three-dimensional rendering of the stadium 102, and, in an embodiment, provides over connection 132, a standalone video output with the object tracking trajectory superimposed on the video output. For the standalone video, an instrumented camera 122 is used to register and align virtual graphics with the live video from the instrumented camera 122. The term "instrumented camera" can refer to any instrumented camera 122 that may comprise servos, rotary encoders, linear encoders, motion capture devices, etc. that can establish the location of the camera relative to the stadium 102 and register and align virtual graphics with the live video. As an example of this application, a colored trail can generated by the 3D rendering engine 124 and applied to the video on connection 148 following the object to show the object's trajectory. If it is determined by the tracking software 200 that the object is destined to be a home run ball, the colored trail can changed to different colors, e.g., yellow, then to green when the object actually crossed the virtual wall. In the embodiment, a viewer is shown the object trajectory when the camera is zoomed in on the object and the viewer can't see the back wall of the stadium 102. The graphics provide direct visual feedback when the status of the object changes in flight.

In an alternative embodiment in which the object tracking trajectory is applied over another graphic, then the output of the 3-D rendering engine 124 is provided over connection 129 to a control board 126. The control board 126 develops a graphics output over connection 134 that is provided to a broadcast system 136. The broadcast system 136 also receives the video output from the instrumented camera 122 over connection 148. The broadcast system 136 can be any television broadcast system as known in the art. The broadcast system 136 includes a graphics overlay system 138. The graphics overlay system 138 receives the graphics output from the control board 126 and provides a video output with the object tracking trajectory over connection 142.

Figure 2:
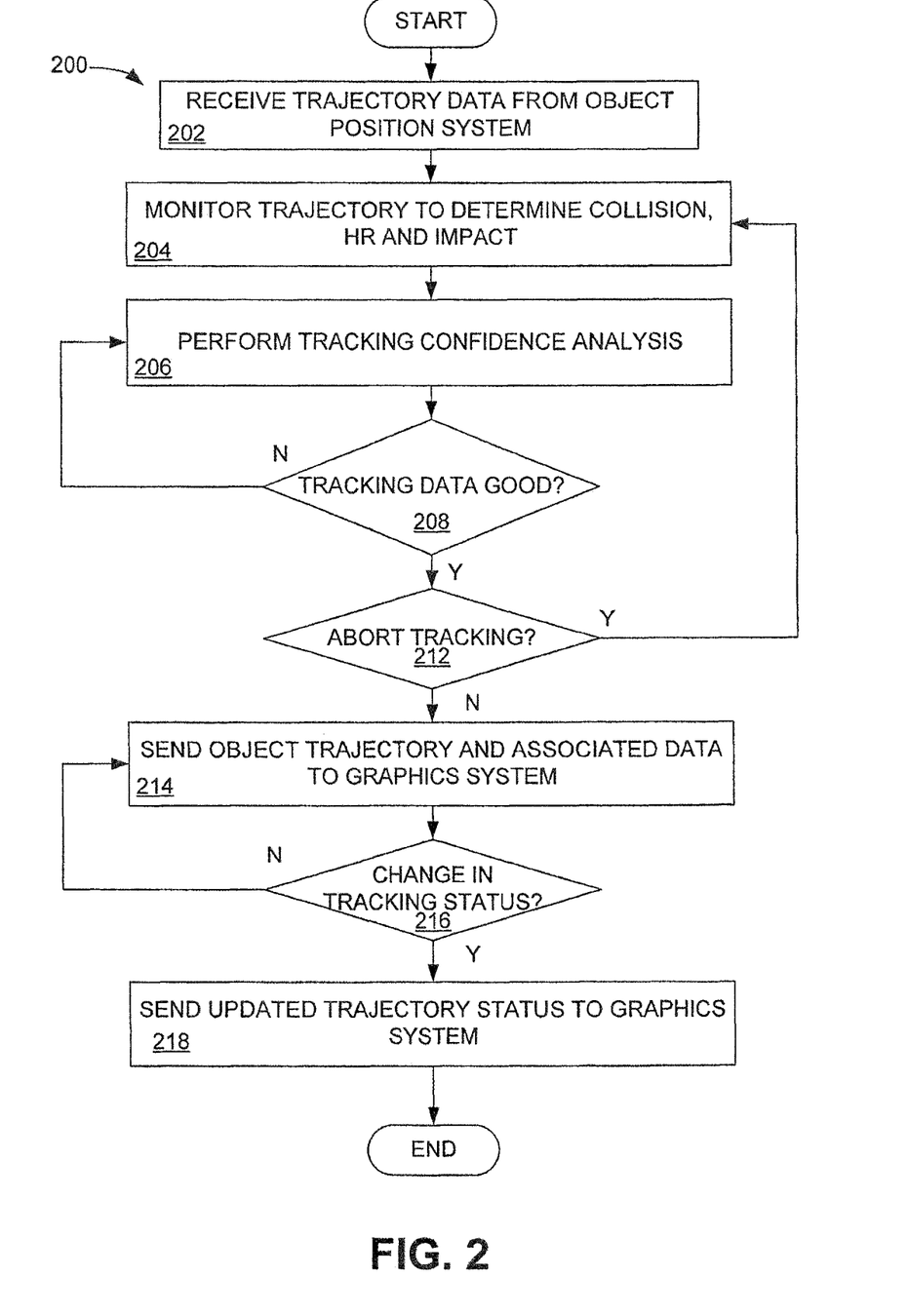
FIG. 2 is a flowchart describing the operation of an embodiment of the tracking software of FIG. 1.

FIG. 2 is a flowchart 200 describing the operation of an embodiment of the tracking software 200 of FIG. 1. The blocks in the flow chart 200, and in the flowcharts to follow, are shown for example purposes and can be performed in or out of the order shown.

In block 202 the tracking software 200 receives object trajectory data from the object position and tracking system 104. The trajectory data relates to the three dimensional location of an object with respect to time. In block 204, the tracking software 200, and more particularly, the collision detection module 210, monitors the trajectory data to determine whether the tracked object has experienced a collision (i.e., whether a baseball has impacted within a stadium), and whether the tracked object has crossed the virtual wall (i.e., whether a baseball has exited the stadium 102 in fair territory as a home run).

In block 206, the tracking confidence and analysis module 220 performs tracking confidence analysis. As an example, the tracking confidence analysis module 220 assesses the trajectory data on connection 106 as each new trajectory point arrives at an example rate of 60 data points/sec. The tracking confidence analysis module 220 considers and assesses object height, distance, and relative position of the object within the estimated trajectory to determine if an "ABORT" signal should be sent. The parameters are adjustable based on the particular object position and tracking system 104. For example, most systems will have what is essentially a field-of-view. When it is known that the object 110 is at the edge of this range, the data will be less reliable, and an operator can choose to issue the ABORT signal. As an example using a baseball as the object 110 and a particular radar-based object position and tracking system 104, a set of estimated ball positions are sent over connection 106 when the object position and tracking system 104 lost the ball. If the ball was still ascending, the estimated data was discarded and an ABORT was signaled by the tracking software 200. However, if the ball was at least 10% down from its apex, the data were considered reliable and the ABORT signal was not issued.

In block 208, it is determined whether the tracking data is acceptable, i.e., whether the tracking data indicates an object trajectory that should be shown as a video overlay. If the tracking data is not acceptable, then the process returns to block 206. If it is determined in block 208, that the tracking data is acceptable, then, in block 212, it is determined whether the tracking should be aborted. Reasons to abort tracking include, but are not limited to, a manual override of otherwise good tracking date for any reason.

If it is determined in block 212 that the tracking should be aborted, then, the process returns to block 204. If however, in block 212 it is determined that the tracking data should not be aborted, then, in block 214, the tracking software 200 sends the object trajectory and associated data to the graphics system 300.

In block 216, it is determined whether there is any change in the tracking status. To accomplish this, the tracking confidence analysis module 220 performs real-time analysis, as described above. If, there is no change in the tracking status, then the process returns to block 214. If however, in block 216 it is determined that there is a change in the tracking status, then, in block 218, updated trajectory status information is sent to the graphics system 300.

Figure 3:
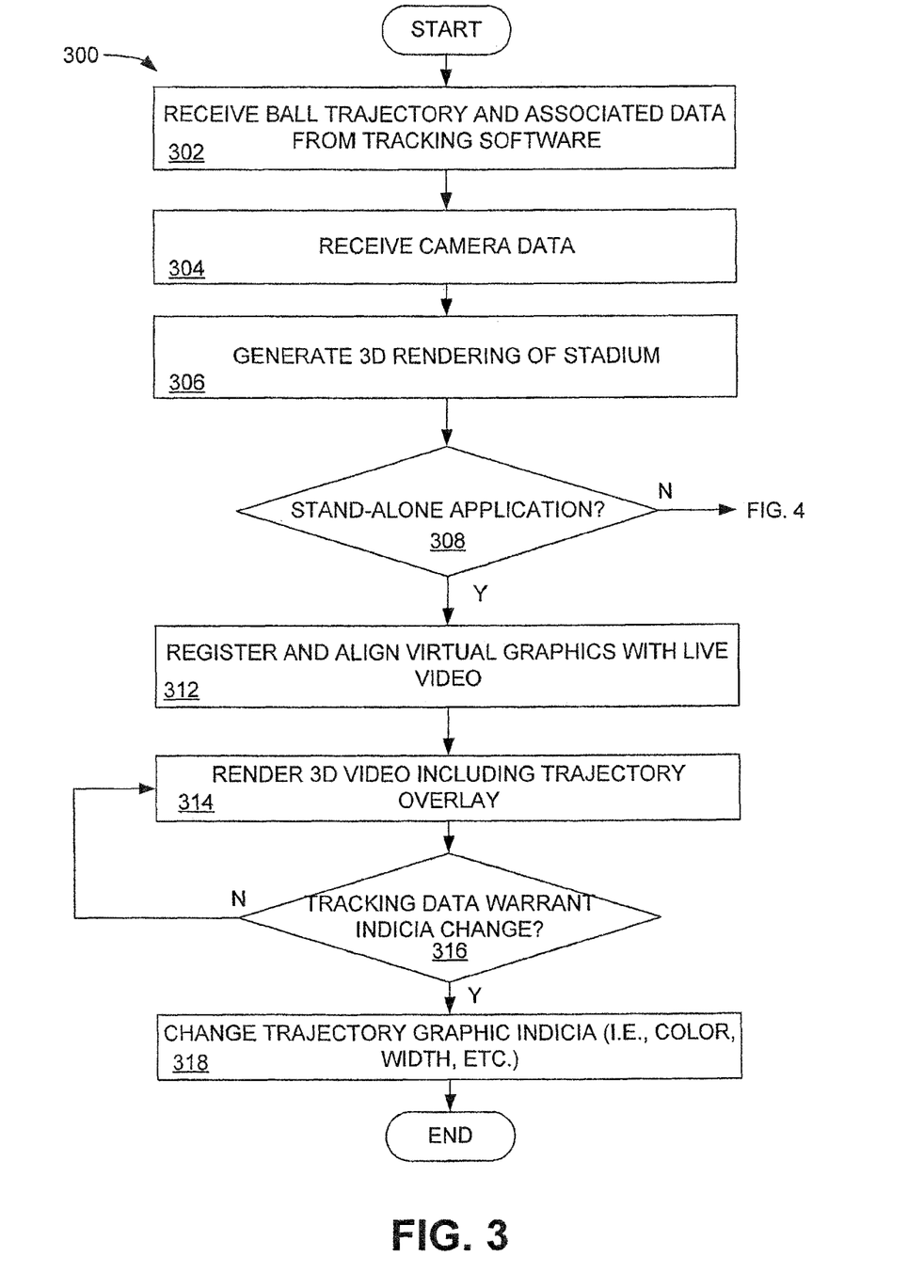
FIG. 3 is a flowchart describing the operation of an embodiment of the graphics system of FIG. 1 in a standalone graphics application.

FIG. 3 is a flowchart 300 describing the operation of an embodiment of the graphics system 300 of FIG. 1 in a standalone graphics application. In block 302, the graphics system 300 receives the ball trajectory and associated data from the tracking software 200. In block 304, the graphics system 300 receives camera data from the instrumented camera 122. In block 306, the 3D rendering engine 124 generates a three-dimensional rendering of the stadium 102. An example of a three-dimensional rendering of the stadium 102 is show in FIGS. 5 and 6.

In block 308, it is determined whether the desired output is a standalone video output or whether the output is to be combined or overlaid over another video broadcast. If, it is determined in block 308 that this is not a standalone application, then the process proceeds to FIG. 4, to be described below. If however, in block 308 it is determined that this is a standalone application, then, in block 312, the graphics system 300 registers and aligns the virtual graphics generated by the 3D rendering engine 124 with the live video feed provided by the instrumented camera 122 over connection 148. In block 314, the graphics system 300 renders a three-dimensional video including the trajectory overlay.

In block 316 it is determined whether the tracking data for the subject trajectory received from the tracking software 200 warrants an indicia change. An indicia change refers to the manner in which the trajectory is shown. For example, the color, width of the line, style of the line, or other indicia used to show the trajectory can be changed, based on the trajectory analysis performed by the tracking confidence analysis module 220. If, in block 316 it is determined that no indicia change is warranted, then the process returns to block 314. If however, in block 316 it is determined that an indicia change is warranted, then, in block 318 the indicia of the trajectory graphic is changed. The indicia change can be based on the predicted trajectory, the actual trajectory, or other factors, and can be based on whether the object has exceeded a boundary. For example, as will be described below in FIG. 5, and FIG. 6, as a trajectory is developed and analyzed, it is determined whether the object impacts within a stadium or whether the object could be a home run ball. If it is determined that the object will be a home run ball, then the indicia, for example the color of the trajectory, can be changed from, for example, white to yellow to green. If the certainty of a home run ball exceeds a certain threshold, then the color of the trajectory can be changed to green, indicating that the object (i.e. the home run ball), has passed, or will pass the virtual wall. Alternatively, if it is determined that the object has collided within the stadium, then the indicia of the object can be changed to illustrate that the object trajectory has terminated.

Figure 4:
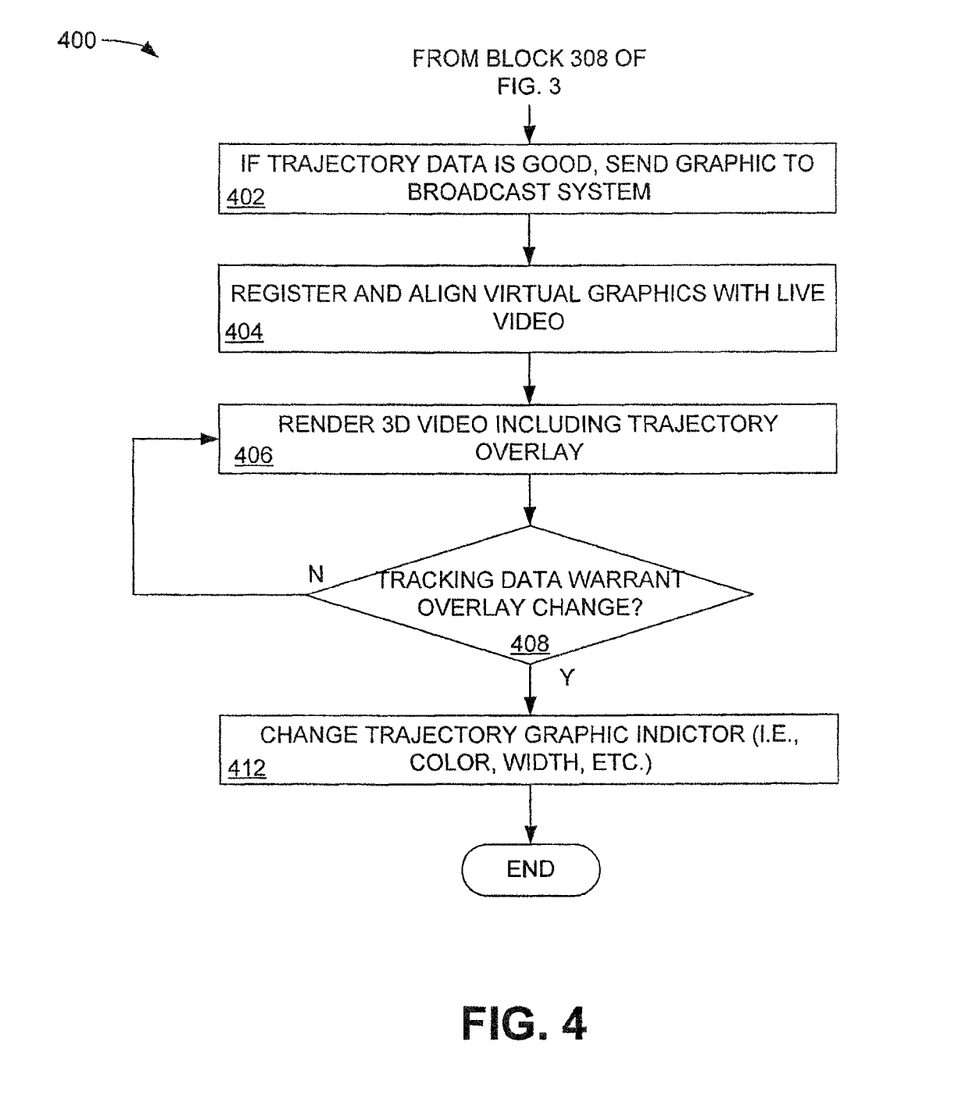
FIG. 4 is a flowchart describing the operation of an embodiment of the graphics system of FIG. 1, in the situation where a graphic overlay will be added to an existing broadcast.

FIG. 4 is a flowchart 400 describing the operation of an embodiment of the graphics system 300 of FIG. 1, in the situation where a graphic overlay will be added to an existing broadcast. In block 402, if the trajectory data is determined to be good by the tracking software 200, the graphics system 300 provides a graphics output over connection 134 to the broadcast system 136. In block 404, the graphics system 300 registers and aligns the virtual graphics generated by the 3D rendering engine 124 with the live video feed provided by the instrumented camera 122 over connection 148. In block 406, the graphics system 300 renders a three-dimensional video including the trajectory overlay.

In block 408 it is determined whether the tracking data for the subject trajectory received from the tracking software 200 warrants an indicia change, as described above. If, in block 408 it is determined that no indicia change is warranted, then the process returns to block 406. If however, in block 408 it is determined that an indicia change is warranted, then, in block 412 the indicia of the trajectory graphic is changed, as described above.

Figure 5:
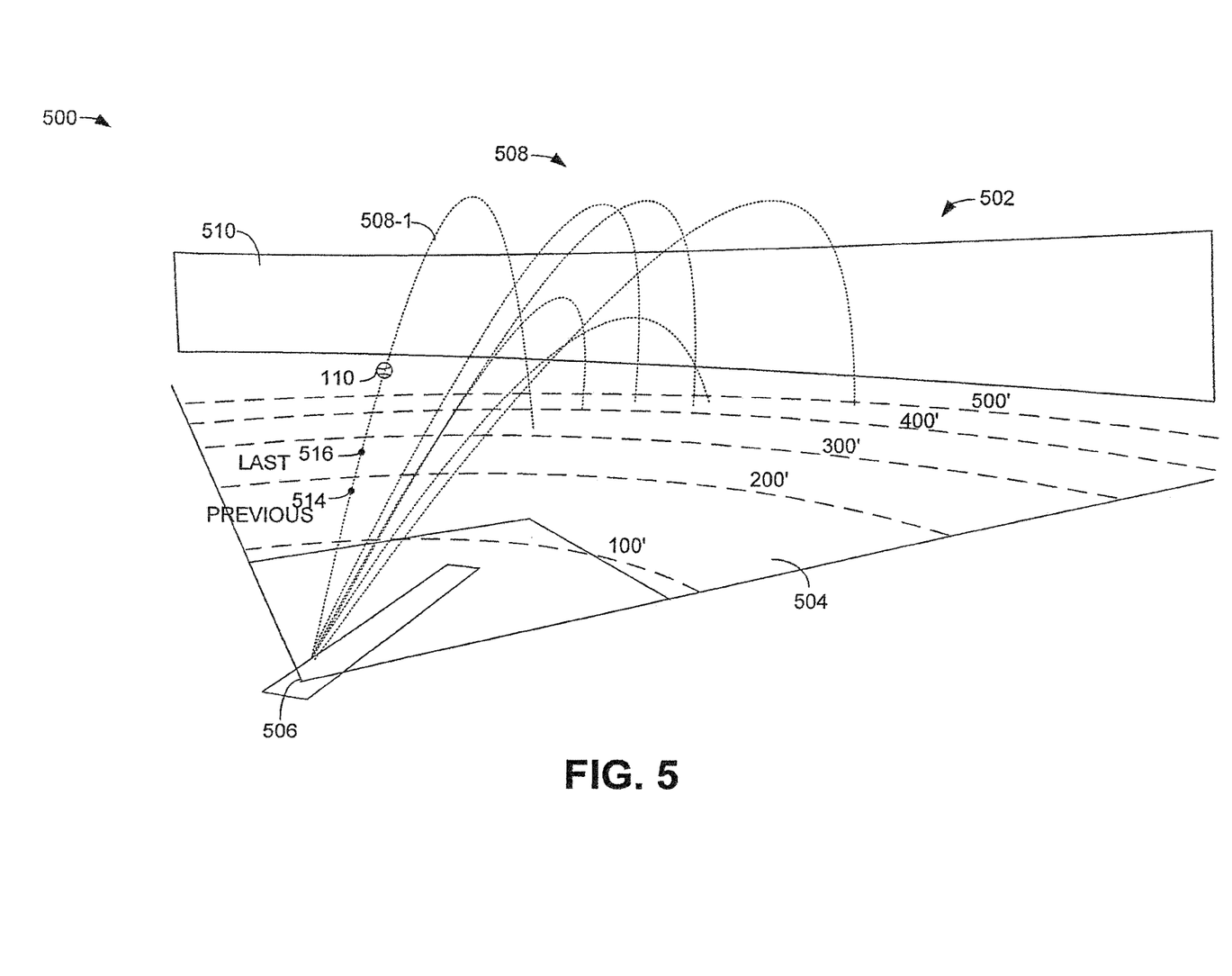
FIG. 5 is a graphical illustration showing a rendering of an environment in which an object is tracked and in which an object trajectory is illustrated.

FIG. 5 is a graphical illustration 500 showing a rendering of an environment in which an object is tracked and in which an object trajectory is illustrated. In an exemplary embodiment, the graphical illustration 500 is shown as a depiction of a baseball stadium 502. The baseball stadium 502 includes a field 504 including distance markers from home plate 506. The distance markers are overlaid on the field 504 as a general reference to illustrate distance from home plate 506.

The graphical illustration 500 also includes a projection of a virtual wall 510. The virtual wall 510 is a three-dimensional rendering that extends vertically upward from a top of an actual stadium wall, indicating the plane that an object must travel through to be considered a home run ball. A boundary can be considered to be any location on the field 504, stands (not shown) or virtual wall 510 where the object may impact.

The graphical illustration 500 also includes a number of object trajectories 508. Although more than one object trajectory 508 is shown in FIG. 5, a typical application will generally show one object trajectory at a time. Using baseball as an example, the object trajectories 508 are illustrated as baseballs that are hit from home plate 506. Using trajectory 508-1 as an example, a number of points on the trajectory 508-1 can be analyzed by the collision detection module 210 (FIG. 1) to determine a number of attributes about the trajectory, and about the path of the object (110, FIG. 1) on the trajectory. For example, the collision detection module 210 can analyze a previous point 514 and a last point 516 on the trajectory 508-1 to determine the location of the object 110, the likelihood of the object 110 exceeding the plane of the virtual wall 510 in fair territory (e.g., whether the object 110 will be a home run ball), and when the object 110 actually exceeds the plane of the virtual wall 510.

Figure 6:
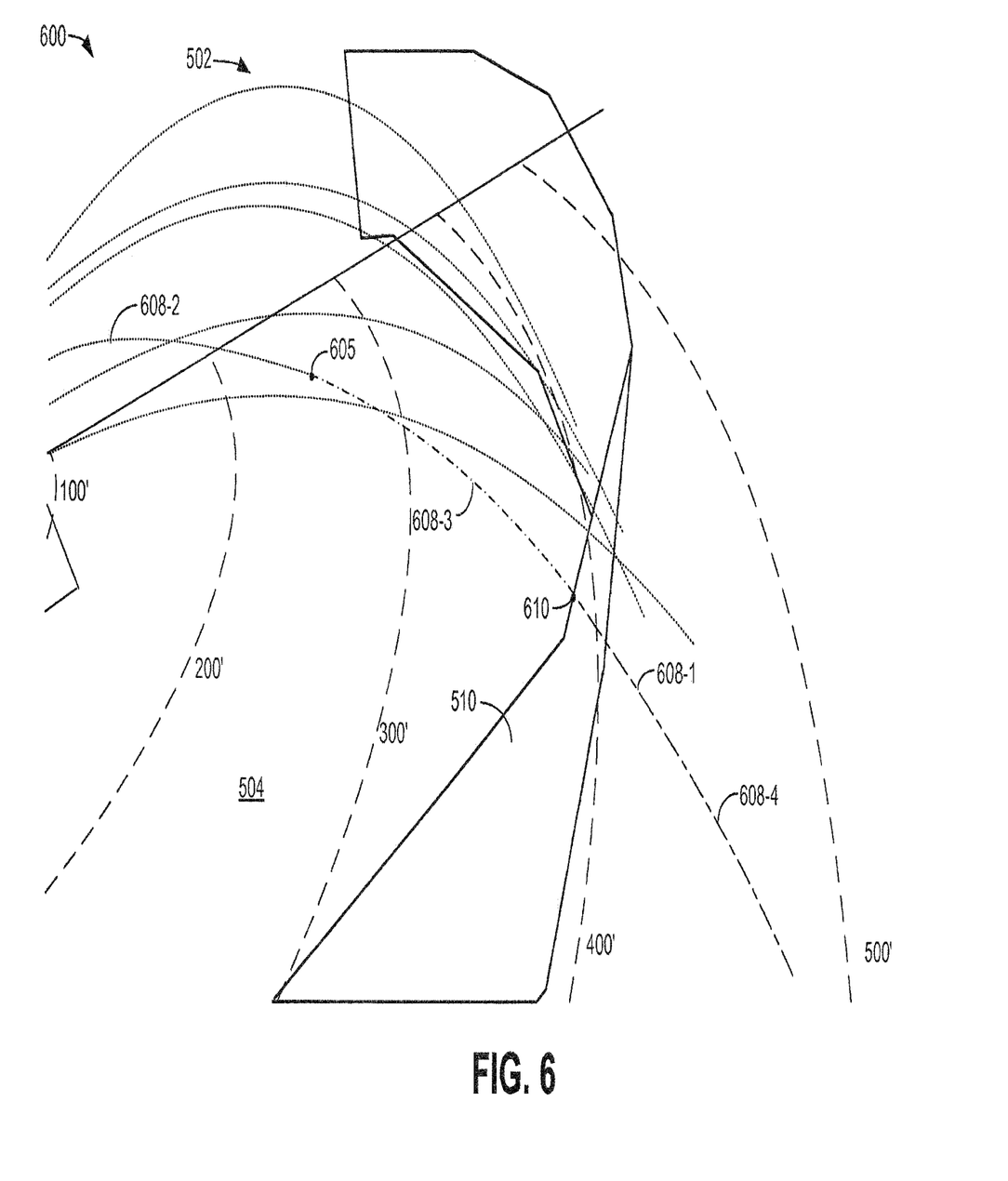
FIG. 6 is a graphical illustration showing another perspective view of the stadium of FIG. 5.

FIG. 6 is a graphical illustration 600 showing another perspective view of the stadium 502 of FIG. 5. The virtual wall 510 is shown in a three-dimensional perspective view as extending upward from the edge of the field 504. The trajectory 608-1 illustrates one possible trajectory of an object 110. The trajectory 608-1 includes trajectory portions 608-2, 608-3 and 608-4. Trajectory portion 608-2 illustrates the trajectory 608-1 at a first time using a fine dotted line. Trajectory portion 608-2 can be the earlier portion of the trajectory 608-1 where the object has initially begun to be tracked. Trajectory portion 608-3 is illustrated using a different dotted line pattern to indicate that the indicia of the trajectory 608-1 has been changed at point 605 due to the occurrence of an event, such as when the tracking software 200 determines that the likelihood of the object 110 exceeding the boundary formed by the virtual wall is relatively high. Trajectory portion 608-4 is illustrated using still another different dotted line pattern to indicate that the indicia of the trajectory 608-1 has again been changed at point 610 due to the occurrence of another event, such as when the tracking software 200 determines that the object has broken the plane of the virtual wall 510. Other indicia, such as line color, line thickness, or other indicia may be used. At the time that the object 110 passes point 610, the indicia of the trajectory 608-1 can be changed so that a viewer observing the graphic overlay would be informed that the ball is a home run ball.

While various embodiments of the invention have been described, it will be apparent to those of ordinary skill in the art that many more embodiments and implementations are possible that are within the scope of the invention.

What is claimed is:

1. A system for dynamically tracking and indicating a path of an object, comprising:
    a radar system that generates three-dimensional object position data, wherein the object position data includes a trajectory of an object;
    a memory storing a software element;
    a processor executing the software element to receive the three-dimensional object position data and determine when the object has landed within a venue, wherein the venue includes a fixed and predetermined venue boundary and after determining the object has landed within the venue boundary, the processor post-processes the trajectory to provide a best-fit smoothed trajectory; and
    a graphics system that displays a graphic based on the best-fit smoothed trajectory.

2. The system of claim 1, wherein the processor receives launch data that includes a spin velocity of the object.

3. The system of claim 2, wherein after determining the object has landed within the venue boundary, the processor post-processes the trajectory to analyze the spin velocity.

4. The system of claim 1, wherein displaying the graphic includes altering a visual indication of the best-fit smoothed trajectory.

5. The system of claim 4, wherein the visual indication of the trajectory is altered before the object has landed within the venue.

6. The system of claim 4, wherein the visual indication of the trajectory is altered after the object has landed within the venue.

7. A method for dynamically tracking and indicating a path of an object, comprising:
    generating three-dimensional object position data, wherein the object position data includes a trajectory of an object;
    determining whether the three-dimensional object position data indicates that the object has impacted within a venue, wherein the venue includes a fixed and predetermined venue boundary;
    when the object has impacted within the venue, post-processing the trajectory to provide a best-fit smoothed trajectory; and
    displaying a graphic based on the best-fit smoothed trajectory.

8. The method of claim 7, wherein the object position data includes a spin velocity of the object.

9. The method of claim 8, further comprising, when the object has impacted within the venue, post-processing the trajectory to analyze the spin velocity.

10. The method of claim 8, wherein the best-fit smoothed trajectory is based on the spin velocity analysis.

11. The method of claim 7, further comprising analyzing a plurality of positions on the trajectory to determine whether the object has exceeded the venue boundary.

12. The method of claim 7, further comprising altering a visual indication of the best-fit smoothed trajectory.

13. The method of claim 12, wherein the visual indication of the trajectory is altered before the object has exceeded the venue boundary or after the object has exceeded the venue boundary.

14. The method of claim 12, wherein the visual indication of the trajectory is altered before the object has landed within the venue or after the object has landed within the venue.

15. A system for dynamically tracking and indicating a path of a baseball, comprising:
    a radar system that generates three-dimensional position data of the baseball, wherein the position data includes a trajectory of the baseball;
    a memory storing a software element;
    a processor executing the software element to receive the position data and determine when the baseball has landed within a venue, wherein the venue includes a fixed and predetermined venue boundary and after determining the baseball has landed within the venue boundary, the processor post-processes the trajectory to provide a best-fit smoothed trajectory; and
    a graphics system that displays a graphic based on the best-fit smoothed trajectory.

16. The system of claim 15, wherein the processor receives launch data of the baseball, wherein the launch data includes a spin velocity of the baseball.

17. The system of claim 16, further comprising post-processing the trajectory to analyze the spin velocity, wherein the best-fit smooth trajectory is based on the spin velocity analysis.

18. The system of claim 15, further comprising altering a visual indication of the best-fit smoothed trajectory, wherein the visual indication of the trajectory is altered before the baseball has exceeded the venue boundary or after the baseball has exceeded the venue boundary.

19. The system of claim 15, further comprising analyzing a plurality of positions on the trajectory to determine whether the baseball will be a homerun.

20. The system of claim 15, further comprising:
    determining when the baseball has been pitched based on the position data; and determining when the baseball has been hit based on the position data, wherein the hit is indicated by a change in direction of the baseball.

* * * * *